United States Patent
Katano (10) Patent No.: US 8,563,190 B2
(45) Date of Patent: Oct. 22, 2013

(54) FUEL CELL SYSTEM INCLUDING COOLANT DE-AIRING PASSAGE

(75) Inventor: Koji Katano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 341 days.

(21) Appl. No.: 13/003,840

(22) PCT Filed: Dec. 16, 2009

(86) PCT No.: PCT/JP2009/006915
§ 371 (c)(1),
(2), (4) Date: Jan. 12, 2011

(87) PCT Pub. No.: WO2011/074032
PCT Pub. Date: Jun. 23, 2011

(65) Prior Publication Data
US 2011/0143248 A1    Jun. 16, 2011

(51) Int. Cl.
*H01M 8/02* (2006.01)
*H01M 8/04* (2006.01)
*H01M 8/24* (2006.01)

(52) U.S. Cl.
USPC ............ 429/437; 429/467; 429/471; 429/517

(58) Field of Classification Search
USPC .............. 429/434, 454, 465, 468, 456, 513; 80/65.31; 123/41.1
See application file for complete search history.

(56) References Cited

U.S. PATENT DOCUMENTS

| | | | |
|---|---|---|---|
| 2002/0187382 A1* | 12/2002 | Nishiumi et al. | 429/34 |
| 2004/0202911 A1* | 10/2004 | Komura et al. | 429/32 |
| 2006/0024542 A1* | 2/2006 | Uozumi et al. | 429/22 |
| 2007/0026267 A1* | 2/2007 | Paulus et al. | 429/13 |
| 2007/0074682 A1* | 4/2007 | Makuta | 123/41.1 |

FOREIGN PATENT DOCUMENTS

| | | |
|---|---|---|
| JP | 2004-288509 A | 10/2004 |
| JP | 2005-285682 A | 10/2005 |
| JP | 2006-032054 A | 2/2006 |
| JP | 2007-103082 A | 4/2007 |
| JP | 2009-158217 A | 7/2009 |
| JP | 2009-199887 A | 9/2009 |

* cited by examiner

*Primary Examiner* — Kenneth Douyette
(74) *Attorney, Agent, or Firm* — Kenyon & Kenyon LLP (57) ABSTRACT

A fuel cell comprises: multiple unit cells stacked upright in a vertical direction or stacked in a vertically inclined orientation; an insulating plate arranged on a vertically upper-side end of the stacked multiple unit cells; a cooling medium supply manifold arranged to distribute a supply flow of a cooling medium into the multiple unit cells and a cooling medium discharge manifold arranged to join together discharged flows of the cooling medium from the multiple unit cells; and a de-airing passage formed to release a gas accumulated in either the cooling medium supply manifold or the cooling medium discharge manifold, wherein the cooling medium supply discharge manifold and the cooling medium discharge manifold are respectively connected to a cooling medium supply piping and a cooling medium discharge piping on a vertically lower-side end of the fuel cell, and the de-airing passage is formed such that a portion of the de-airing passage is made in the insulating plate wherein the portion of the de-airing passage extends in a direction perpendicular to a stacking direction of the unit cells, and the de-airing passage is connected to either the cooling medium discharge manifold or the cooling medium supply manifold on a vertically upper end side of the cooling medium discharge manifold or the cooling medium supply manifold.

5 Claims, 8 Drawing Sheets

FUEL CELL SYSTEM INCLUDING COOLANT DE-AIRING PASSAGE

This is a 371 national phase application of PCT/JP2009/006915 filed 16 Dec. 2009, the content of which is incorporated herein by reference.

FIELD OF THE INVENTION

The present invention relates to a technique of releasing a gas accumulated in a manifold for a cooling medium (coolant) of a fuel cell.

BACKGROUND OF THE INVENTION

One known structure for releasing a gas generated in a cooling medium of a fuel cell has a deairing hole provided at a higher position than the position of a cooling medium supply inlet and connected to cooling medium supply communication holes (see, for example, Patent Document 1).

CITATION LIST

Patent Literature

[PTL1] JP2006-32054 A

SUMMARY OF INVENTION

Technical Problem

The known structure has, however, not sufficiently considered a potential leakage of electric current by electrical conductivity of the cooling medium (coolant).

In order to address at least part of the issue discussed above, there is a requirement for easily releasing air bubbles present in a cooling medium in a fuel cell and preventing leakage of electric current via the cooling medium.

Solution to Problem

[Aspect 1]
A fuel cell, comprising:
multiple unit cells stacked upright in a vertical direction or stacked in a vertically inclined orientation;
an insulating plate arranged on a vertically upper-side end of the stacked multiple unit cells;
a cooling medium supply manifold arranged to distribute a supply flow of a cooling medium into the multiple unit cells and a cooling medium discharge manifold arranged to join together discharged flows of the cooling medium from the multiple unit cells; and
a de-airing passage formed to release a gas accumulated in either the cooling medium supply manifold or the cooling medium discharge manifold,
wherein the cooling medium supply manifold and the cooling medium discharge manifold are respectively connected to a cooling medium supply piping and a cooling medium discharge piping on a vertically lower-side end of the fuel cell, and
the de-airing passage is formed such that a portion of the de-airing passage is made in the insulating plate wherein the portion of the de-airing passage extends in a direction perpendicular to a stacking direction of the unit cells, and the de-airing passage is connected to either the cooling medium discharge manifold or the cooling medium supply manifold on a vertically upper end side of the cooling medium discharge manifold or the cooling medium supply manifold.

In the fuel cell according to this aspect of the invention, the deairing passage including the section extended in the direction perpendicular to the stacking direction of the unit cells is formed in the insulating plate arranged on the vertically upper side of the stacked unit cells. This arrangement facilitates upward release of the air bubbles and enables an increase of electric resistance of the cooling medium in the deairing passage, thus minimizing a leak current via the deairing passage.

[Aspect 2]
The fuel cell in accordance with aspect 1, wherein one end of the de-airing passage is connected to either the cooling medium discharge manifold or the cooling medium supply manifold, and
the other end of the de-airing passage is connected to a joint for releasing the air at a position proximal to a middle of an outer circumferential side of the insulating plate.

The fuel cell of this embodiment elongates the deairing passage and thus enables an increase of the electric resistance in the deairing passage.

[Aspect 3]
The fuel cell in accordance with aspect 2, further comprising:
an end plate arranged adjacent to the insulating plate,
wherein the joint is received in the end plate such that the joint has no protrusion from a parallelepiped defined by an outer circumference of the end plate.

The fuel cell of this embodiment effectively avoids contact of any other member with the joint and thereby prevents leakage of electric current.

[Aspect 4]
The fuel cell in accordance with any one of aspects 1 through 3,
wherein the multiple unit cells are arranged to form two parallel cell stacks,
the two cell stacks are stacked to generate voltages in opposite directions and are electrically connected by a common collector provided on a vertically lower side of the fuel cell, and
each of the two cell stacks has:
the insulating plate arranged on a vertically upper-side end of the cell stack of the unit cells;
the cooling medium supply manifold arranged to distribute a supply flow of the cooling medium into the cell stack of the multiple unit cells and a cooling medium discharge manifold arranged to join together discharged flows of the cooling medium from the cell stack of the multiple unit cells; and
the de-airing passage formed to release the gas accumulated in either the cooling medium supply manifold or the cooling medium discharge manifold.

The arrangement of the invention is applicable to the fuel cell of this embodiment with the two cell stacks arranged in parallel.

[Aspect 5]
The fuel cell in accordance with aspect 4, wherein one common insulating plate is provided across and over the two cell stacks as the insulating plate arranged on the vertically upper-side ends of the two cell stacks, and
the two de-airing passages are arranged to communication with each other in the common insulating plate.

The fuel cell of this embodiment has only one route for leakage out of the fuel cell.

The invention is not restricted to the fuel cell having any of the arrangements described above but may also be actualized by any of other diverse applications, for example, a fuel cell vehicle and a method of releasing a gas from cooling water in a fuel cell. The present invention is not restricted to any of the above applications but may be implemented in any of various applications, embodiments, and arrangements within the scope of the invention.

DETAILED DESCRIPTION

First Embodiment

Figure 1:
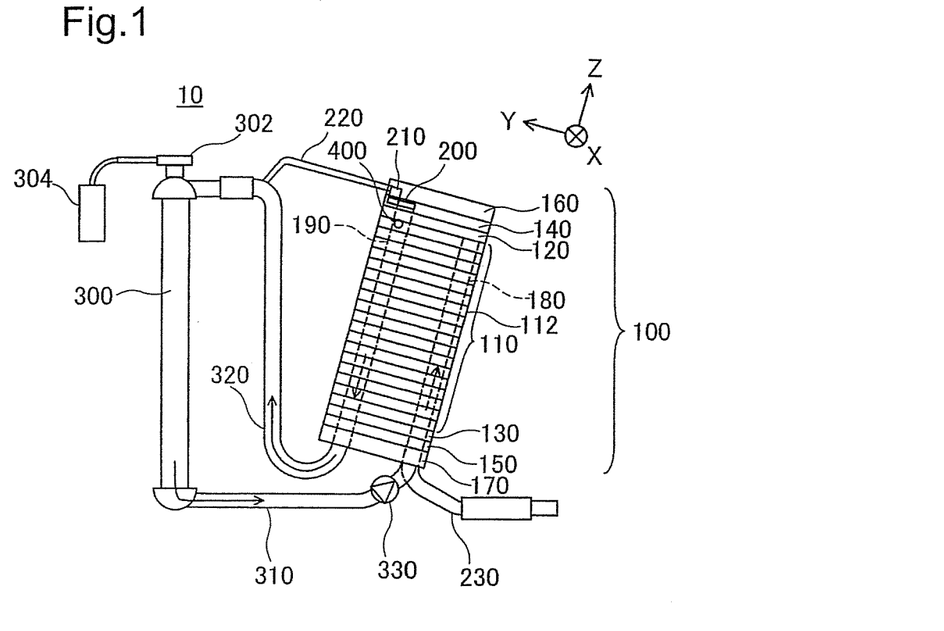
FIG. 1 is an explanatory diagrammatic representation of the configuration of a fuel cell system.

FIG. 1 is an explanatory diagrammatic representation of the configuration of a fuel cell system. The fuel cell system 10 is mounted on, for example, a vehicle, though a support structure for mounting is omitted from the illustration. The fuel cell system 10 includes a fuel cell 100 and a radiator 300. The fuel cell 100 has a cell stack 110 and collectors 120 and 130, insulators 140 and 150 (insulating plates), and end plates 160 and 170 that are respectively and sequentially placed on both ends of the cell stack 110. The cell stack 110 includes a number of unit cells 112 stacked up in vertically inclined orientation. The collector 120 on the vertically upper side serves as a positive electrode plate, while the collector 130 on the vertically lower side serves as a negative electrode plate. The polarity of the electrode plates may be inverted.

The two end plates 160 and 170 are fastened with a tension rod (not shown), such that the cell stack 110 is fastened with fixed fastening power. The lower-side end plate 170 is also used for attachment of the fuel cell stack to a vehicle body (not shown).

The fuel cell 100 internally has a cooling water supply manifold 180 and a cooling water discharge manifold 190. The cooling water supply manifold 180 is formed through the lower-side end plate 170, the lower-side insulator 150, the lower-side collector 130, and the cell stack 110. The cooling water discharge manifold 190 is formed through the lower-side end plate 170, the lower-side insulator 150, the lower-side collector 130, the cell stack 110, and additionally the upper-side collector 120. A cooling water flow path, which is not illustrated in FIG. 1, is formed in a separator (not shown) interposed between each pair of adjoining unit cells 112 to connect the cooling water supply manifold 180 with the cooling water discharge manifold 190. The individual unit cells 112 of the fuel cell 100 are cooled down by a flow of water through these cooling water flow paths.

A cooling water supply piping 310 connects the cooling water supply manifold 180 with the radiator 300. The cooling water supply piping 310 is connected to the cooling water supply manifold 180 at the vertically lower-side end plate 170 of the fuel cell 100. A cooling water supply pump 330 is provided on the cooling water supply piping 310. A cooling water discharge piping 320 connects the cooling water discharge manifold 190 with the radiator 300. The cooling water discharge piping 320 is similarly connected to the cooling water discharge manifold 190 at the vertically lower-side end plate 170 of the fuel cell 100. The fuel cell system 10 further includes a fuel gas supply piping, a fuel gas exhaust piping, an oxidizing gas supply piping (all not shown), and an oxidizing gas exhaust piping 230. These pipings respectively have connections at the vertically lower-side end plate 170 of the fuel cell 100. Such concentrated arrangement of the pipings on one end of the stacking direction of the cell stack 110 is especially suitable for the application of the fuel cell 100 to the vehicle to facilitate the piping layout in a limited space of the vehicle for the fuel cell 100 (for example, an engine compartment). The pipings are positioned on the vertically lower side of the fuel cell, because water produced through electrochemical reactions in the fuel cell is more readily releasable from the oxidizing gas exhaust piping 230 on the vertically lower side.

The radiator 300 has a radiator cap 302 and a sub-tank 304 attached to the radiator cap 302. The radiator cap 302 and the sub-tank 304 are used for pressure regulation in the radiator 300.

The insulator 140 has a deairing passage 200 to release air bubbles 400 accumulated in an upper most portion of the cooling water discharge manifold 190. The deairing passage 200 is provided at this position, since the air bubbles 400 formed in the cooling water tend to gather to the upper most portion of the cooling water discharge manifold 190, which represents a vertically uppermost position of the cooling water supply manifold 180 and the cooling water discharge manifold 190 in this embodiment. The deairing passage 200 is connected to a deairing hose 220 via a joint 210. The details of this structure will be described later. The deairing hose 220 is connected to the cooling water discharge piping 320. Alternatively the deairing hose 220 may be connected to the radiator 300.

Figure 2:
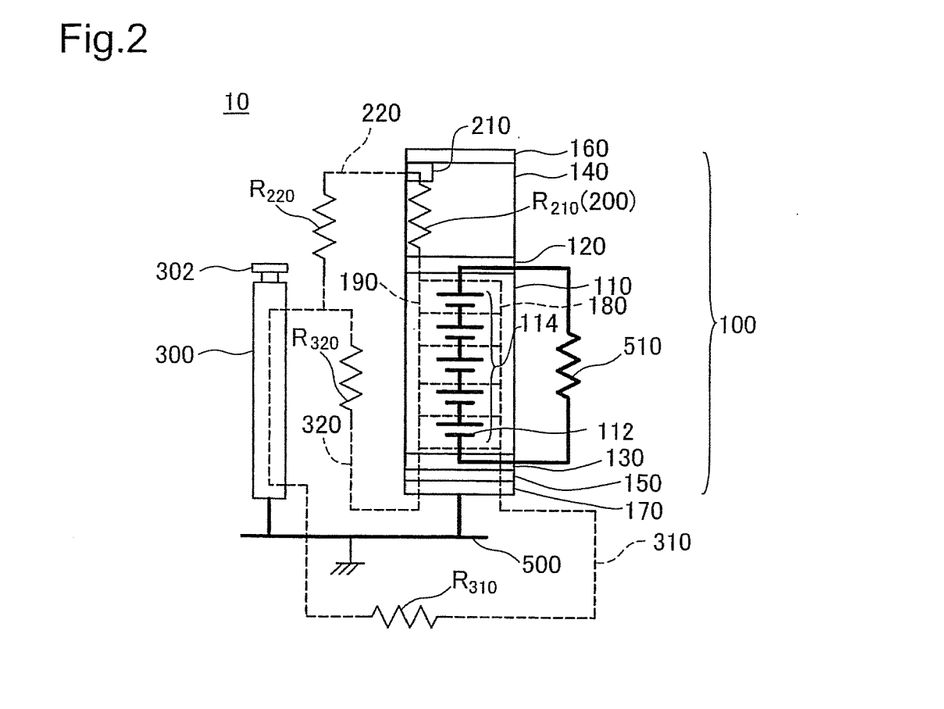
FIG. 2 is an explanatory diagrammatic representation of an electric circuit equivalent to the fuel cell system.

FIG. 2 is an explanatory diagrammatic representation of an electric circuit equivalent to the fuel cell system. The fuel cell 100 and the radiator 300 are schematically shown with a vehicle body 500 in FIG. 2. The radiator 300 and the fuel cell 100 are attached to the body 500. Electrical continuity is established between the radiator 300 and the body 500 and between the negative-side end plate 170 of the fuel cell 100 and the body 500. Namely electrical continuity is established between the radiator 300 and the end plate 170 of the fuel cell 100 via the body 500. The radiator 300, the body 500, and the end plate 170 are generally made of metal materials. There is accordingly an extremely low electric resistance between the radiator 300 and the end plate 170 via the body 500. In this embodiment, a potential of the body 500 is set to a ground potential (GND).

The radiator 300 and the fuel cell 100 are interconnected via the flow of cooling water. The electric continuity through the cooling water is discussed here. Water (pure water) has a specific resistance (theoretical value) of 18.24 MΩ·cm at 25° C. Water having such an extremely high resistance value is substantially non-conductive. Inclusion of some impurities, specifically ions, in water lowers the specific resistance and causes water to have electrical conductivity. The ions may be metal ions dissolved from the metal materials of, for example, the fuel cell 100 and the radiator 300. The specific resistance of cooling water is lower than the specific resistance of pure water. An ion exchanger may be used to readily give cooling water having a specific resistance of or above 1 MΩ·cm.

With referring to FIG. 2, the cooling water supply piping 310 and the cooling water discharge piping 320 provided between the radiator 300 and the negative side of the fuel cell 100 are respectively expressed as electric resistances $R_{310}$ and $R_{320}$. These electric resistances $R_{310}$ and $R_{320}$ may be neglected, because of the following reason. As explained above, electrical continuity is established between the radiator 300 and the end plate 170 of the fuel cell 100 via the body 500. The radiator 300, the body 500, and the end plate 170 are made of metal materials, so that the electric resistance between the radiator 300 and the end plate 170 via the body is significantly lower than the electric resistances R310 and R320 of the cooling water supply piping 310 and the cooling water discharge piping 320. The cooling water supply piping 310 and the cooling water discharge piping 320 are both connected to the negative side of the fuel cell 100 and thereby have an identical potential. Accordingly there is neither electric current from the cooling water supply piping 310 to the cooling water discharge piping 320 nor electric current from the cooling water discharge piping 320 to the cooling water supply piping 310. The cooling water supply piping 310 and the cooling water discharge piping 320 are preferably thickened to lower the flow resistance. This arrangement does not require a high performance of the cooling water supply pump 330.

The cell stack 110 forms a series battery 114. The positive-side collector 120 and the negative-side collector 130 of the series battery 114 are linked to an external load 510. The collector 130 is insulated from the end plate 170 by the insulator 150. Electrical continuity via the metal is thereby not established between the negative-side collector 130 and the negative-side end plate 170. The cooling water in the cooling water supply manifold 180 and the cooling water discharge manifold 190 is, however, present between the negative-side collector 130 and the negative-side end plate 170. As described above, the cooling water generally used for fuel cells has the electrical conductivity, so that electrical continuity via the cooling water is established between the negative-side collector 130 and the negative-side end plate 170.

The following describes the electrical continuity between the positive-side collector 120 and the radiator 300. The insulator 140 has the deairing passage 200, which communicates with the cooling water discharge manifold 190. The deairing passage 200 (detailed structure will be described later) is connected to the cooling water discharge piping 320 via the joint 210 and the deairing hose 220. Namely electrical continuity is established between the positive-side collector 120 and the radiator 300 via the cooling water present in the deairing passage 200, the joint 210, the deairing hose 220, and the cooling water discharge piping 320.

A leak current Ia flowing from the positive-side collector 120 (potential=Va) of the fuel cell 100 to the radiator 300 (potential=GND) is expressed as $Ia=Va/(R_{200}+R_{220})$, where Va denotes an electromotive force of the fuel cell 100, $R_{200}$ denotes an electric resistance of the deairing passage 200, and $R_{220}$ denotes an electric resistance of the deairing hose 220. The calculation of the leak current Ia is on the assumption that the electric resistances of the joint 210 and the cooling water discharge piping 320 on the route of the electrical continuity are sufficiently lower than the electric resistance $R_{200}$ of the deairing passage 200 and the electric resistance $R_{220}$ of the deairing hose 220.

The leak current Ia may be lowered by increasing either the electric resistance $R_{200}$ of the deairing passage 200 or the electric resistance $R_{220}$ of the deairing hose 220. Increasing the electric resistance $R_{200}$ of the deairing passage 200 is preferential. The deairing passage 200 is placed inside the fuel cell 100, while the deairing hose 220 is placed outside the fuel cell 100. Increasing the electric resistance $R_{200}$ of water in the deairing passage 200 enhances a voltage drop in the fuel cell 100 on the route of the electrical continuity and thus allows for the use of the joint 210 made of a metal material. The joint 210 has electrical continuity with the lower-side end plate 170 via the upper-side end plate 160 and the tension rod (not shown) and further with the body 500 (=GND, FIG. 2). A sufficient high level of the electric resistance $R_{200}$ in the deairing passage 200 can decrease a leak current Ib (=Va/$R_{200}$) on this route.

Figure 3:
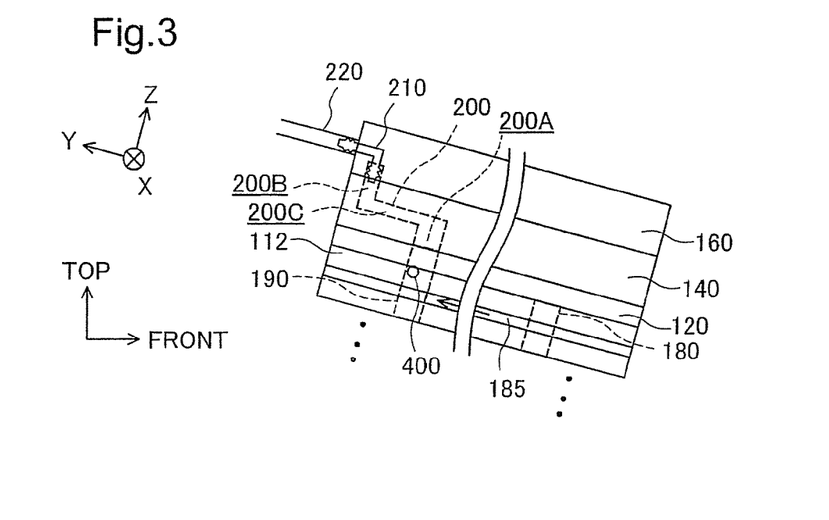
FIG. 3 is an enlarged explanatory diagrammatic representation of the periphery of the de-airing passage 200.

FIG. 3 is an enlarged explanatory diagrammatic representation of the periphery of the deairing passage 200. The deairing passage 200 is formed inside the insulator 140 to have a crank shape. The deairing passage 200 has a lower end section 200A, an upper end section 200B, and an electric resistance-generating section 200C. The lower end section 200A communicates with the cooling water discharge manifold 190. The upper end section 200B is connected to the joint 210. A hollow L-shaped member is used for the joint 210 in this embodiment. The electric resistance-generating section 200C is extended in a direction perpendicular to the stacking direction of the unit cells 112 and connects the lower end section 200A with the upper end section 200B. This arrangement enables elongation of the electric resistance-generating section 200C and thereby an increase of electric resistance in the electric resistance-generating section 200C. The joint 210 is provided at a higher position in the vertical direction than the position of the deairing passage 200. The air bubbles 400 moving up in the cooling water discharge manifold 190 accordingly pass through the deairing passage 200, the joint 210, and the deairing hose 220 to be discharged out of the fuel cell 100. The cooling water is also discharged along the same route. There is, however, no need of thickening the deairing passage 200, since this route is not a main discharge route of the cooling water.

As described above, the fuel cell 100 has a cooling flow path 185 provided between each pair of adjoining unit cells 112 to connect the cooling water supply manifold 180 with the cooling water discharge manifold 190. The cooling water flow path 185 is formed in the separator (not shown).

Figure 4:
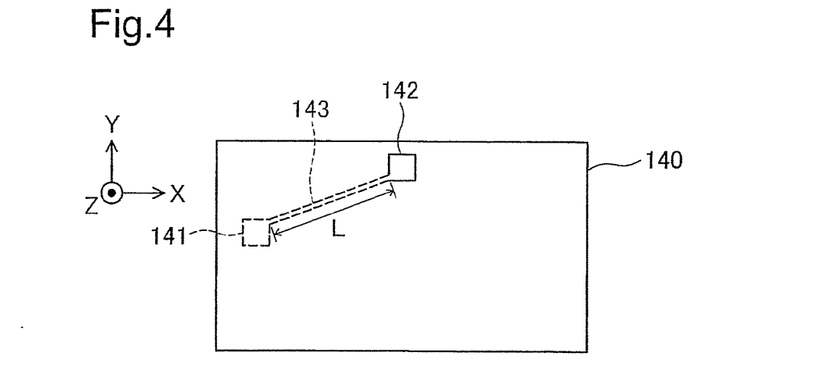
FIG. 4 is a plan view diagrammatic representation of the insulator 140 seen from a direction Z (corresponding to the stacking direction of the unit cells).

FIG. 4 is a plan view diagrammatic representation of the insulator 140 seen from a direction Z (corresponding to the stacking direction of the unit cells). The insulator 140 has two recesses 141 and 142 and a tubular section 143. The recesses 141 and 142 are provided on opposing faces of the insulator 140 to respectively form the lower end section 200A and the upper end section 200B explained above with reference to FIG. 3. The tubular section 143 forms the electric resistance-generating section 200C explained above with reference to FIG. 3. The recess 141 is provided proximal to and on the substantial middle of one shorter side end of the insulator 140 or more specifically at a position corresponding to the cooling water discharge manifold 190 shown in FIG. 1. The recess 142 is provided proximal to and on the substantial middle of one longitudinal side end of the insulator 140. This arrangement gives the tubular section 143 having a sufficiently large length L and thereby enables an increase of the electric resistance in the electrical resistance-generating section 200C (electric resistance $R_{200}$, FIG. 2).

Figure 5:
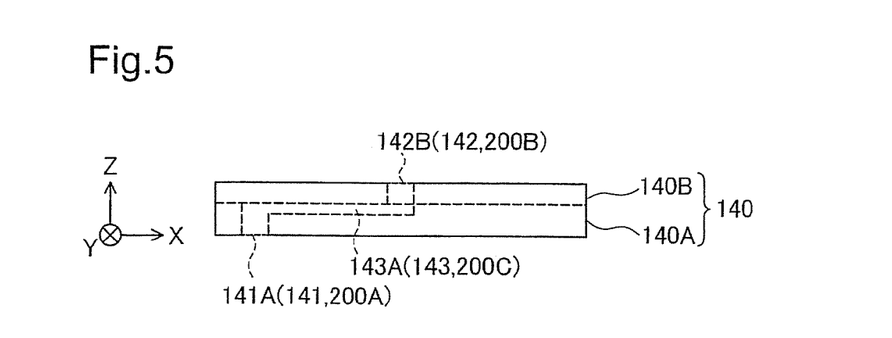
FIG. 5 is a side view diagrammatic representation of the insulator seen from a direction Y (corresponding to the direction along the planes of the unit cells).

FIG. 5 is a side view diagrammatic representation of the insulator seen from a direction Y (corresponding to the direction along the planes of the unit cells). The insulator 140 has two insulator members 140A and 140B. The insulator member 140A has a concave 141A and a groove 143A. The concave 141A is formed through the insulator member 140A. The concave 141A forms the recess 141 shown in FIG. 4 and thereby serves as the lower end section 200A shown in FIG. 3. The insulator member 140B has a concave 142B. The concave 142B is formed through the insulator member 140B. The concave 142B forms the recess 142 shown in FIG. 4 and thereby serves as the upper end section 200B shown in FIG. 3. The groove 143A of the insulator member 140A is extended from the concave 141A to a certain position corresponding to the concave 142B of the insulator member 140B in the state of combining the two insulator members 140A and 140B together. The two insulator members 140A and 140B are combined together to have the groove 143A inside therebetween. The top of the groove 143A is accordingly covered with the insulator member 140B to provide the tubular section 143 shown in FIG. 4 and serve as the electric resistance-generating section 200C. In this embodiment, the groove 143A is formed in the insulator member 140A. The groove 143A may be formed in at least one of the insulator members 140A and 140B.

Figure 6:
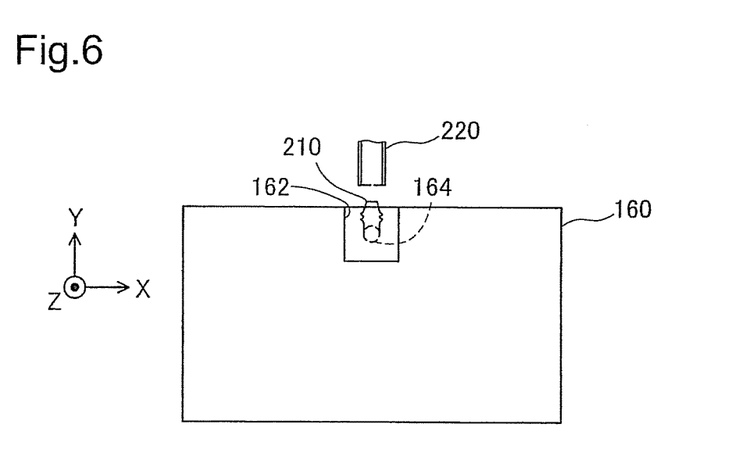
FIG. 6 is a plan view diagrammatic representation of the end plate 160 seen from the direction Z.
Figure 7:
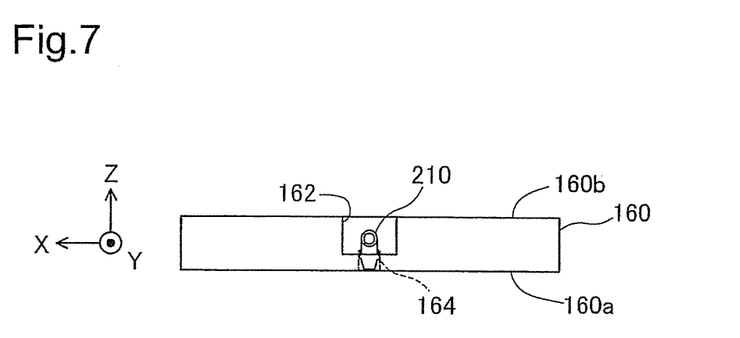
FIG. 7 is a side view diagrammatic representation of the end plate 160 seen from the direction Y.

FIG. 6 is a plan view diagrammatic representation of the end plate 160 seen from the direction Z. FIG. 7 is a side view diagrammatic representation of the end plate 160 seen from the direction Y. The end plate 160 has a surface 160a on which the insulator 140 is placed and a cutout 162 formed on the substantial middle of a longitudinal side on an opposite surface 160b. There is a hole 164 extended from a bottom of the cutout 162 to the surface 160a on which the insulator 140 is placed. In the stacked arrangement of the end plate 160 and the insulator 140, the hole 164 communicates with the recess 142 of the insulator 140 (FIG. 4). The joint 210 is connected to the cutout 162. A tube fitting is provided on one end of the joint 210 for connection of the deairing hose 220. The joint 210 is preferably received within the cutout 162, i.e., within a parallelepiped defined by the outer circumference of the end plate 160. Receiving the joint 210 within the parallelepiped defined by the outer circumference of the end plate 160 effectively avoids contact of any other member with the joint 210 and thereby prevents leakage of electric current. Even when the vehicle is subject to an impact, for example, by a collision, the joint 210 is protected by the end plate 160 and is thus not easily destroyed.

In the embodiment, the deairing passage 200 is formed in the upper-side insulator 140 of the fuel cell 100 to include the electric resistance-generating section 200C extended in the direction perpendicular to the stacking direction of the unit cells 112. This arrangement enables an increase of the electric resistance in the deairing passage 200 and thereby a decrease of the leak current via the deairing passage 200.

In the embodiment, the joint 210 is connected to the recess 142 formed proximal to the substantial middle on one longitudinal side of the insulator 140. This arrangement gives the tubular section 143 having a sufficiently large length L and thereby enables an increase of the electric resistance in the electrical resistance-generating section 200C.

In the embodiment, the joint 210 is received within the cutout 162 of the end plate 160 with no protrusion from the periphery of the cutout 162. This arrangement effectively avoids contact of any other member with the joint 210 and thereby prevents leakage of electric current. Even when the vehicle is subject to impact by, for example, a collision, the joint 210 is protected by the end plate 160 and is thus not easily destroyed.

Modification of First Embodiment

Figure 8:
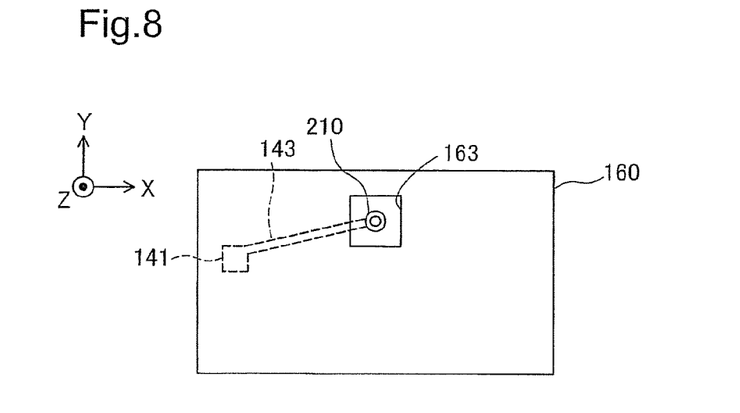
FIG. 8 is a plan view diagrammatic representation of an end plate 160 in one modified structure seen from the direction Z.
Figure 9:
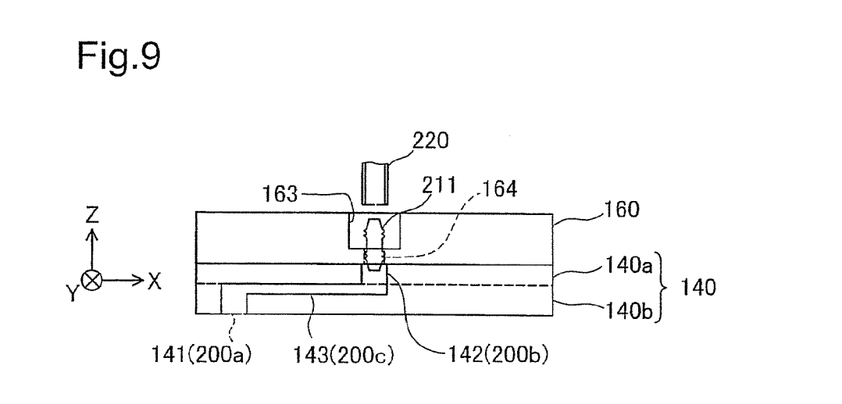
FIG. 9 is a side view diagrammatic representation of an insulator 140 and the end plate 160 in the modified structure of FIG. 8 seen from the direction Y.

FIG. 8 is a plan view diagrammatic representation of an end plate 160 in one modified structure seen from the direction Z. FIG. 9 is a side view diagrammatic representation of an insulator 140 and the end plate 160 in the modified structure of FIG. 8 seen from the direction Y. In the structure of the embodiment shown in FIG. 6, the end plate 160 has the cutout 162 provided at the position proximal to the substantial middle of one longitudinal side thereof. In the modified structure, a recess 163 is provided at a position slightly shifted toward the center of the end plate from the substantial middle of the longitudinal side of the end plate 160. While the structure of the embodiment shown in FIG. 6 uses the L-shaped joint 210, the modified structure uses a straight joint 211. The position of a section 200B of a deairing passage 200 formed in the insulator 140 is shifted corresponding to the position of the recess 163 formed in the end plate 160. As in this modified structure, the joint 211 may be provided at the position slightly shifted toward the center of the end plate from the substantial middle of the longitudinal side of the end plate 160. In this modified structure, the joint 211 has five closed sides and an open top side among six sides. This arrangement more effectively avoids contact of any other member with the joint 211 and prevents leakage of electric current. Even when the vehicle is subject to impact by, for example, a collision, the joint 211 is not easily destroyed.

Figure 10:
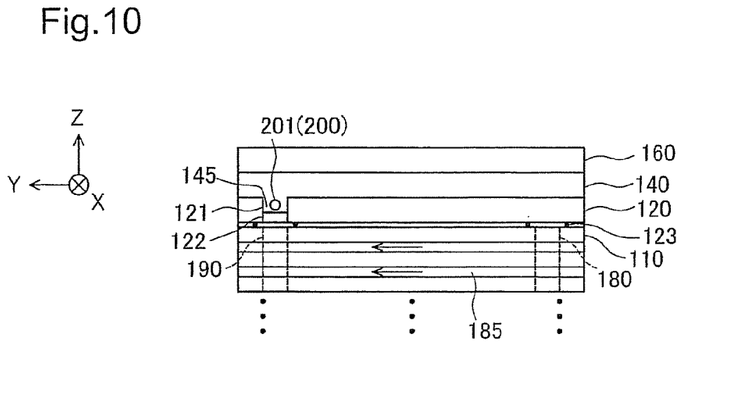
FIG. 10 is side view diagrammatic representation of part of a fuel cell stack in another modified structure seen from a direction X.
Figure 11:
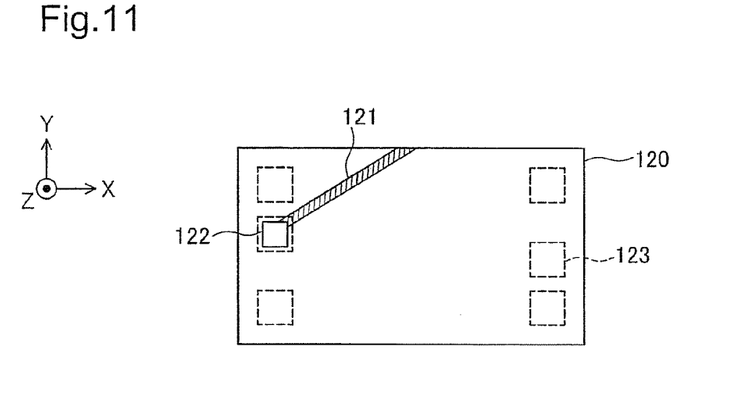
FIG. 11 is a plan view diagrammatic representation of a collector in the modified structure of FIG. 10.

FIG. 10 is side view diagrammatic representation of part of a fuel cell stack in another modified structure seen from a direction X. FIG. 11 is a plan view diagrammatic representation of a collector in the modified structure of FIG. 10. In the modified structure of FIG. 10, an insulator 140 has a band-like projection 145 on the side of a collector 120. A deairing tube 201 is provided inside the projection 145. The deairing tube 201 serves as a deairing passage 200. The insulator 140 is made of an insulating resin and can be integrally formed with the deairing tube 201 by injection molding. The insulator 140 may be formed by combining multiple insulator members together as described above in the embodiment.

The collector 120 has a band-like recess 121 formed to receive the projection 145 of the insulator 140 fitted therein. As long as the collector 120 serves to collect electricity generated by the unit cells 112, the collector 120 is not subject to a strict strength demand and may accordingly have the recess 121 of this shape. The insulator 140 has the deairing passage 200 provided not inside thereof but inside the projection 145. This structure effectively enhances the strength of the insulator 140. The deairing passage 200 may not be wholly located inside the projection 145 but may be at least partly located inside the projection 145.

With referring to FIG. 11, the collector 120 has seal members 123 provided on an opposite side thereof to the side proximate to the insulator 140. The unit cells 112 are arranged on the opposite side of the collector 120 to the side proximate to the insulator 140. Supply manifolds and exhaust manifolds (not shown) for reactive gases (fuel gas and oxidizing gas), as well as the cooling water supply manifold 180 and the cooling water discharge manifold 190 discussed above are formed through the unit cells 112. The seal members 123 create seals to prevent leakage of the cooling water and the reactive gases from a boundary between the collector 120 and the unit cells 112.

The recess 121 is preferably formed in a portion of the collector 120 without the seal members 123. This arrangement effectively prevents an unstable variation in surface pressure of the seal members 123.

Figure 12:
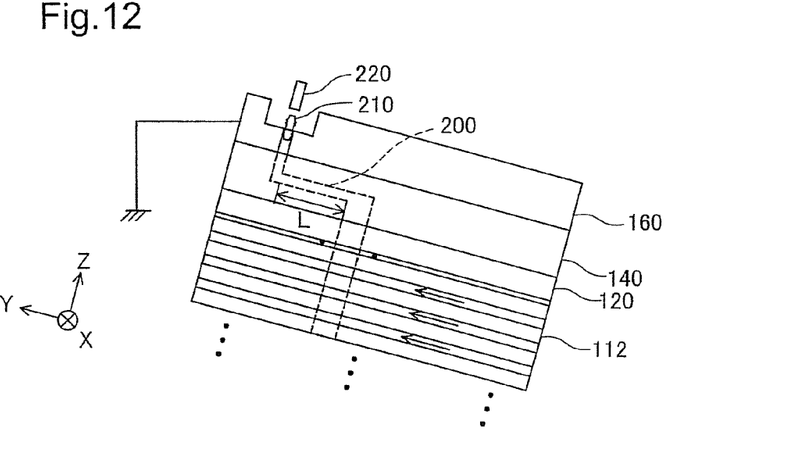
FIG. 12 is an explanatory diagrammatic representation of another modified structure.

FIG. 12 is an explanatory diagrammatic representation of another modified structure. The upper-side end plate 160 may be used, in combination with the lower-side end plate 170 to fasten the fuel cell 100 to the body 500. In this structure, the end plate 160 is grounded to the body 500 (FIG. 2). The collector 120 has electrical continuity with the end plate 160 via the cooling water in the deairing passage 200 and further with the body 500. Namely the leak current flows from the collector 120 to the body 500. The deairing passage 200 designed to have the sufficiently large length L assures a required level of electric resistance and thereby restricts the magnitude of leak current to or below a preset level. The upper-side end plate 160 may thus be grounded to the body 500. In this case, the joint 210 may be made of a metal material. Since the end plate 160 is grounded to the body 500, there is only a negligible level of leakage of electric current from the joint 210 via the water in the deairing hose 220.

Second Embodiment

Figure 13:
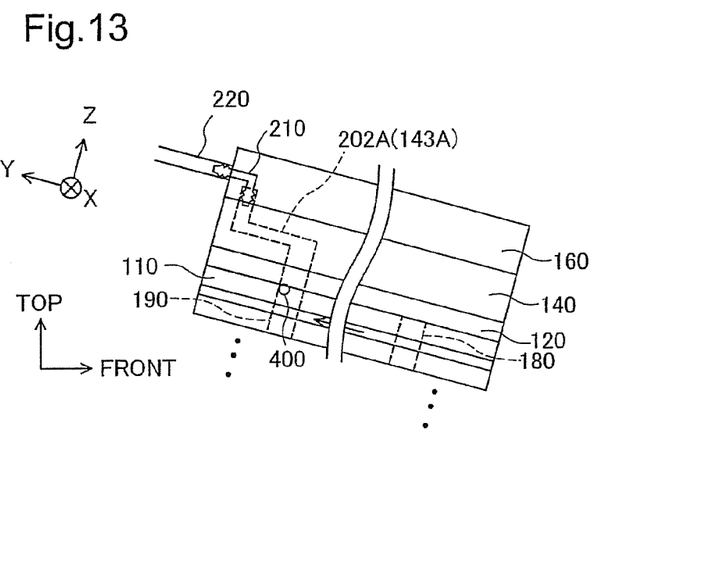
FIG. 13 is a side view diagrammatic representation of part of fuel cell stacks of a second embodiment seen from the direction X.
Figure 14:
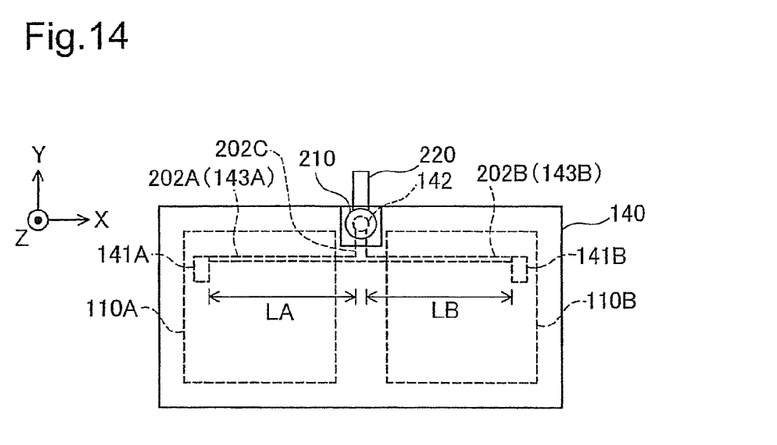
FIG. 14 is a plan view diagrammatic representation of an insulator of the second embodiment seen from the direction Z.

FIG. 13 is a side view diagrammatic representation of part of fuel cell stacks of a second embodiment seen from the direction X. FIG. 14 is a plan view diagrammatic representation of an insulator of the second embodiment seen from the direction Z. A fuel cell system of the second embodiment has two cell stacks 110A and 110B, each being formed by stacking a number of unit cells 112. In this embodiment, the two cell stacks 110A and 110B are aligned in a horizontal direction (direction X) as shown in FIG. 14. The two cell stacks 110A and 110B have electromotive forces in opposite directions.

In this embodiment, the cell stacks 110A and 110B respectively have deairing passages 202A and 202B. The deairing passage 202A has a recess 141A connected to a cooling water discharge manifold (not shown) and provided at a position proximal to an opposite end of the cell stack 110A to the end proximate to the cell stack 110B. Similarly the deairing passage 202B has a recess 141B provided at a corresponding position. This arrangement causes the recess 141A to be distant from the recess 141B. The two deairing passages 202A and 202B join together on the substantial middle of one longitudinal side of the insulator 140 to form one deairing passage 202C, which is connected to a recess 142. The arrangement of joining the two deairing passages 202A and 202B together requires only one joint 210 and only one deairing hose 220. The arrangement of making the two recesses 141A and 141B distant from each other allows the deairing passages 202A and 202B to have sufficiently long lengths LA and LB before the confluence, thus enabling increases of electric resistances ($R_{202A}$ and $R_{202B}$) of the deairing passages 202A and 202B.

Figure 15:
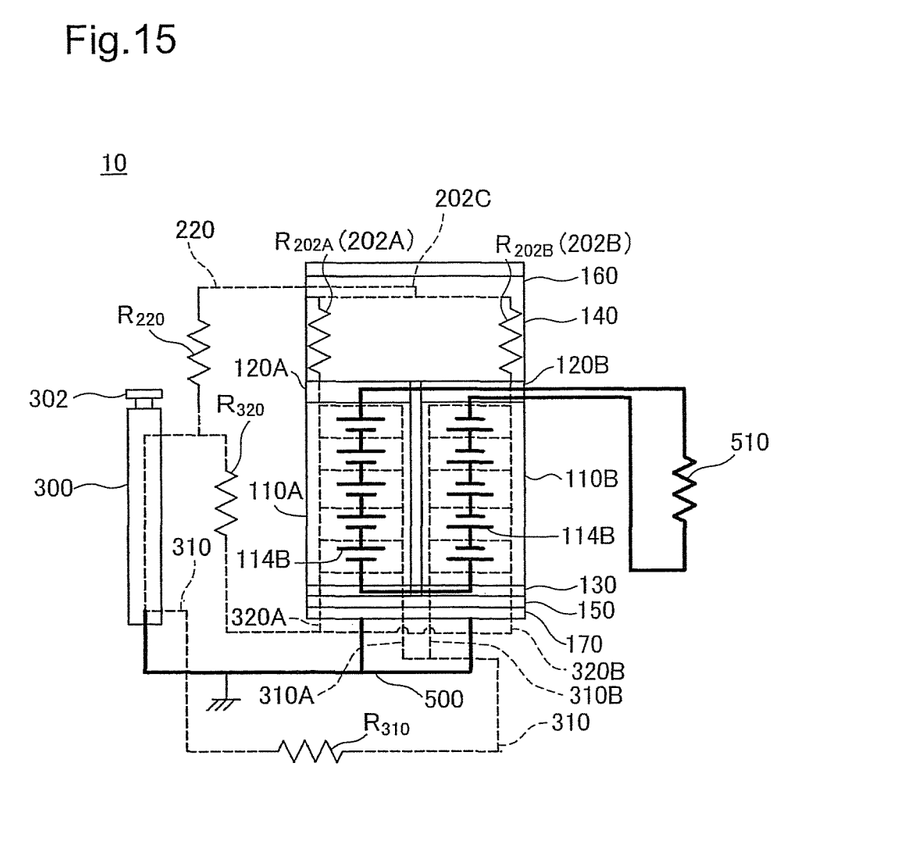
FIG. 15 is an explanatory diagrammatic representation of an equivalent electric circuit according to the second embodiment.

FIG. 15 is an explanatory diagrammatic representation of an equivalent electric circuit according to the second embodiment. The following mainly describes differences from the electric circuit of FIG. 2. The two cell stacks 110A and 110B respectively form series batteries 114A and 114B. The series batteries 114A and 114B have electromotive forces in opposite directions. A collector 120A is provided on a vertically upper side (positive side) of the cell stack 110A, while a collector 120B is provided on a vertically upper side (negative side) of the cell stack 110B. The two collectors 120A and 120B are insulated from each other and are connected to a load 500. An insulator 140 and an end plate 160 are provided to be arranged vertically above the collectors 120A and 120B for the respective cell stacks 110A and 110B. Each of the insulator 140 and the end plate 160 is not divided into separate parts for the two cell stacks 110A and 110B but is integral for the common use. A collector 130, an insulator 150, and an end plate 170 are provided vertically below the cell stacks 110A and 110B. The collector 130 is not divided into separate parts for the two fuel stacks 110A and 110B and connects a negative side of the series battery 114A with a positive side of the series battery 114B. The insulator 150 and the end plate 170 are also not divided into separate parts for the two cell stacks 110A and 110B.

The two deairing passages 202A and 202B are formed inside the insulator 140 to generate electric resistances $R_{202A}$ and $R_{202B}$. The two deairing passages 202A and 202B join together to form the deairing passage 202C, which is connected to the deairing hose 220 via the joint 210 (not shown).

The deairing passages having the enhanced electric resistances are also applicable to the fuel cell system 10 of the second embodiment with the two cell stacks 110A and 110B arranged in parallel. The collector 130 for connecting the two cell stacks 110A and 110B electrically in series is preferably provided on the side of a cooling water supply piping 310 and a cooling water discharge piping 320. This arrangement causes a cooling water supply pipe 310A for a supply flow of cooling water to the cell stack 110A and a cooling water supply pipe 310B for a supply flow of cooling water to the cell stack 110B to have an identical potential, while causing a cooling water discharge pipe 320A for a discharged flow of cooling water from the cell stack 110A and a cooling water discharge pipe 320B for a discharged flow of cooling water from the cell stack 110B to have an identical potential. This effectively prevent leakage of electric current between the cooling water supply conduit 310A and the cooling water supply conduit 310B and leakage of electric current between the cooling water discharge conduit 320A and the cooling water discharge conduit 320B.

In the structure of this embodiment, one common insulator 140 is provided above the two cell stacks 110A and 110B, and the two deairing passages 202A and 202B join together (communication with each other) inside the insulator 140. There is accordingly only one route of leakage out of the fuel cell system 10. This structure requires only one joint 210 and only one deairing hose 220. Alternatively insulators 140 as well as joints 210 and deairing hoses 220 may be provided separately for the two cell stacks 110A and 110B.

Figure 16:
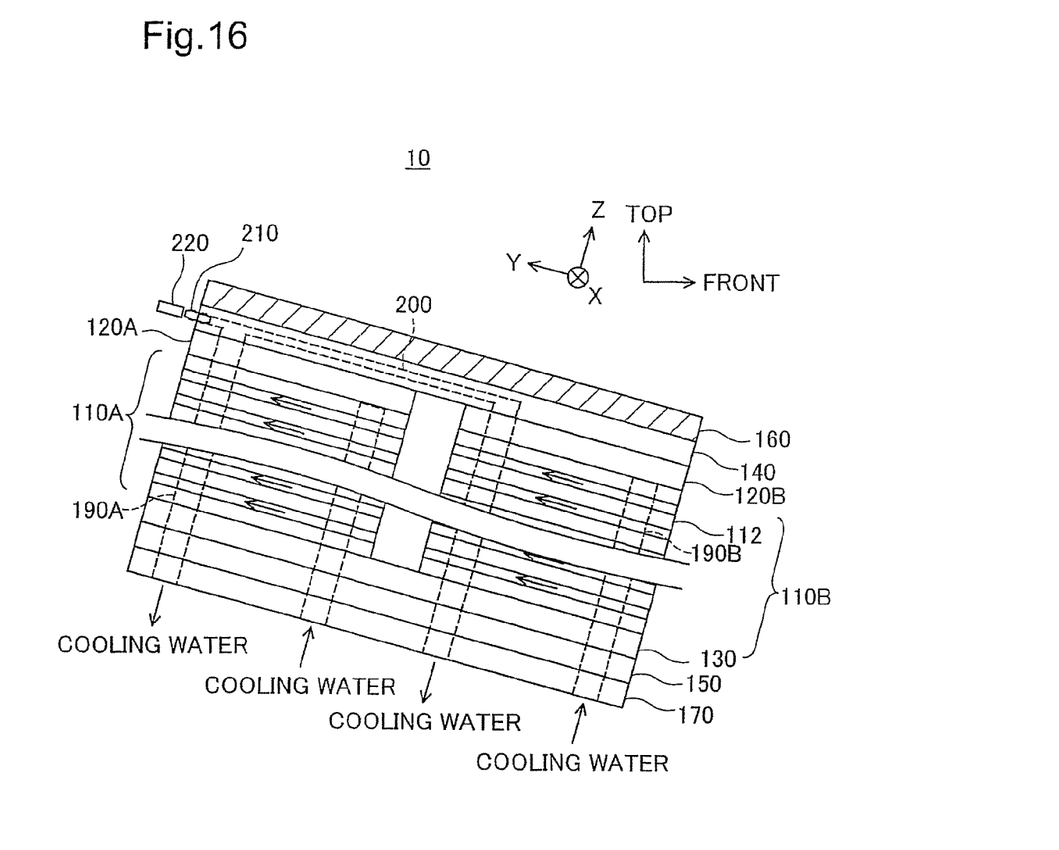
FIG. 16 is an explanatory diagrammatic representation of one modified structure of the second embodiment.

FIG. 16 is an explanatory diagrammatic representation of one modified structure of the second embodiment. In this modified structure, two cell stacks 110A and 110B are aligned in the direction Y, such that the cell stack 110A is located vertically at a higher position than the cell stack 110B. In this structure, a deairing passage for the cell stack 110A may have a shorter length than a deairing passage for the cell stack 110B. The electric resistance is generally proportional to the length/area. The deairing passages may thus be formed such that the length/area of the deairing passage for the fuel cell stack 110A is practically equal to the length/area of the deairing passage for the fuel cell stack 110B.

In any of the embodiments and their modified structures described above, the electric resistance-generating section 200C (tubular section 143) of the deairing passage 200 is illustrated (for example, FIG. 4) to have a straight shape. The electric resistance-generating section 200C may be formed in a folded shape or in a curved shape. These shapes elongate the electric resistance-generating section 200C than the straight shape, thus enabling an increase of the electric resistance $R_{200}$.

In any of the embodiments and their modified structures described above, the joint 210 is received in the cutout 162 or the recess 163 formed in the end plate 160. Alternatively the joint 210 may be received in a cutout or a recess formed in the insulator 140.

In any of the embodiments and their modified structures described above, cooling water is used as the cooling medium. Any other suitable coolant may be used for the cooling medium.

In the structure of the first embodiment, the unit cells 112 are stacked up in the vertically inclined orientation. Unit cells may be stacked upright in the vertical direction.

In any of the embodiments and their modified structures described above, the deairing passage 200 is connected to the cooling water discharge manifold 190. Alternatively the deairing passage 200 may be connected to the cooling water supply manifold 180.

The embodiments and their modified examples are described for the better understanding of the invention and are to be considered in all aspects as illustrative and not restrictive. There may be many modifications, changes, and alterations without departing from the scope or spirit of the main characteristics of the present invention. All such modifications and changes that come within the meaning and range of equivalency of the claims are to be embraced within their scope.

DESCRIPTION OF MARK 10 fuel cell system
100, 100A, 100B fuel cell
110, 110A, 110B cell stack
112 single cell
114, 114A, 114B series battery
120, 120A, 120B, 130 collector
121 band-like recess
123 seal members
140 insulator
140A, 140B insulator member
141, 142, 141A, 142A concave
143 tubular section
143A groove
145 projection
150 insulator
160 end plate
163 recess
164 hole
170 end plate
180 cooling water supply manifold
185 cooling flow path
190 cooling water discharge manifold
200, 202A, 202B, 202C de-airing passage
200A lower end section
200B upper end section
200C electric resistance-generating section
201 de-airing tube
210, 211 joint
220 de-airing hose
230 oxidizing gas exhaust piping
300 radiator
302 radiator cap
304 sub-tank
310 cooling water supply piping
320 cooling water discharge piping
330 cooling water supply pump
400 air bubble
500 body
510 external load
Ia leak current
Ib leak current
$R_{200}$, $R_{220}$, $R_{310}$, $R_{320}$, $R_{202A}$, $R_{202B}$ electric resistance
Va electromotive force (potential)

The invention claimed is:

1. A fuel cell, comprising:
multiple unit cells stacked upright in a vertical direction or stacked in a vertically inclined orientation;
an insulating plate arranged on a vertically upper-side end of the stacked multiple unit cells;
a cooling medium supply manifold arranged to distribute a supply flow of a cooling medium into the multiple unit cells and a cooling medium discharge manifold arranged to join together discharged flows of the cooling medium from the multiple unit cells; and
a de-airing passage formed to release a gas accumulated in either the cooling medium supply manifold or the cooling medium discharge manifold,
wherein the cooling medium supply manifold and the cooling medium discharge manifold are respectively connected to a cooling medium supply piping and a cooling medium discharge piping on a vertically lower-side end of the fuel cell, and
the de-airing passage includes a lower end section, an upper end section, and an electric resistance-generating portion, the de-airing passage is formed such that the electric resistance-generating portion is located in the insulating plate, includes a tubular section, and extends in a direction perpendicular to a stacking direction of the unit cells, and the de-airing passage is connected to either the cooling medium discharge manifold or the cooling medium supply manifold on a vertically upper end side of the cooling medium discharge manifold or the cooling medium supply manifold.

2. The fuel cell in accordance with claim 1, wherein one end of the de-airing passage is connected to either the cooling medium discharge manifold or the cooling medium supply manifold, and
the other end of the de-airing passage is connected to a joint for releasing the air at a position proximal to a middle of an outer circumferential side of the insulating plate.

3. The fuel cell in accordance with claim 2, further comprising:
an end plate arranged adjacent to the insulating plate,
wherein the joint is received in the end plate such that the joint has no protrusion from a parallelepiped defined by an outer circumference of the end plate.

4. The fuel cell in accordance with claim 1,
wherein the multiple unit cells are arranged to form two parallel cell stacks,
the two cell stacks are stacked to generate voltages in opposite directions and are electrically connected by a common collector provided on a vertically lower side of the fuel cell, and
each of the two cell stacks has:
- the insulating plate arranged on a vertically upper-side end of the cell stack of the unit cells;
- the cooling medium supply manifold arranged to distribute a supply flow of the cooling medium into the cell stack of the multiple unit cells and a cooling medium discharge manifold arranged to join together discharged flows of the cooling medium from the cell stack of the multiple unit cells; and
- the de-airing passage formed to release the gas accumulated in either the cooling medium supply manifold or the cooling medium discharge manifold.

5. The fuel cell in accordance with claim 4, wherein one common insulating plate is provided across and over the two cell stacks as the insulating plate arranged on the vertically upper-side ends of the two cell stacks, and
the two de-airing passages are arranged to communicate with each other in the common insulating plate.

* * * * *